(12) United States Patent
Kendrick et al.

(10) Patent No.: US 8,812,401 B2
(45) Date of Patent: Aug. 19, 2014

(54) SECURE PAYMENT CAPTURE PROCESSES

(75) Inventors: Jeff P. Kendrick, Salt Lake City, UT (US); Darrel Grant Welling, Bountiful, UT (US); Bryce Weldon Thacker, Alpine, UT (US)

(73) Assignee: Propay USA Inc., Orem, UT (US)

( * ) Notice: Subject to any disclaimer, the term of this patent is extended or adjusted under 35 U.S.C. 154(b) by 1398 days.

(21) Appl. No.: 11/943,477

(22) Filed: Nov. 20, 2007

(65) Prior Publication Data

US 2009/0132424 A1    May 21, 2009

(51) Int. Cl.
*G06Q 20/00* (2012.01)
*G06Q 20/10* (2012.01)
*G06Q 20/38* (2012.01)

(52) U.S. Cl.
CPC ............ *G06Q 20/105* (2013.01); *G06Q 20/382* (2013.01)
USPC .................................. 705/65; 705/64; 705/75

(58) Field of Classification Search
None
See application file for complete search history.

(56) References Cited

U.S. PATENT DOCUMENTS

| | | | |
|---|---|---|---|
| 6,038,552 | A | 3/2000 | Fleichel et al. |
| 6,732,925 | B1 * | 5/2004 | Takayasu ...................... 235/451 |
| 7,103,576 | B2 | 9/2006 | Mann, III et al. |
| 7,165,052 | B2 | 1/2007 | Dively et al. |
| 7,184,980 | B2 | 2/2007 | Allen-Rouman |
| 7,225,156 | B2 | 5/2007 | Fisher et al. |
| 7,284,696 | B2 * | 10/2007 | Begola .......................... 235/380 |
| 7,303,120 | B2 * | 12/2007 | Beenau et al. ................. 235/380 |
| 7,542,942 | B2 * | 6/2009 | Peart et al. ...................... 705/39 |
| 2001/0014878 | A1 | 8/2001 | Mitra et al. |
| 2001/0029485 | A1 | 10/2001 | Brody et al. |
| 2002/0103753 | A1 | 8/2002 | Schimmel |
| 2002/0169720 | A1 | 11/2002 | Wilson et al. |
| 2004/0083184 | A1 | 4/2004 | Tsuei et al. |
| 2004/0122767 | A1 | 6/2004 | Sanchez |
| 2004/0127256 | A1 | 7/2004 | Goldthwaite et al. |
| 2004/0153481 | A1 * | 8/2004 | Talluri .......................... 707/200 |
| 2005/0015332 | A1 | 1/2005 | Chen |
| 2005/0035190 | A1 | 2/2005 | Nanbu et al. |
| 2005/0086160 | A1 | 4/2005 | Wong et al. |
| 2006/0064372 | A1 | 3/2006 | Gupta |
| 2006/0255128 | A1 * | 11/2006 | Johnson et al. ............... 235/380 |

(Continued)

FOREIGN PATENT DOCUMENTS

KR    10-2003-0042788 A    6/2003
KR    1020050001214 A    6/2005

OTHER PUBLICATIONS

U.S. Appl. No. 12/054,304, filed Kendrick et al.
U.S. Appl. No. 12/185,706, filed Aug. 1, 2008, Goodrich et al.

(Continued)

*Primary Examiner* — Calvin L Hewitt, II
*Assistant Examiner* — Mohammad A Nilforoush
(74) *Attorney, Agent, or Firm* — Brooks Kushman P.C.

(57) ABSTRACT

Methods and processes for securely capturing payment device information and conveying the securely captured payment device information to a client application on a merchant's client device in a manner that does not require that the payment device information to be displayed to the merchant. The client application generates and submits a payment authorization request to a payment authorization service in a manner that does not require the payment information to be displayed to the merchant. The merchant receives a status of the payment authorization request as approved, denied, or process failure. Payment capture can be made before an active connection is made with the merchant's client device, or can occur in real-time.

5 Claims, 8 Drawing Sheets

(56) References Cited

U.S. PATENT DOCUMENTS

| | | | |
|---|---|---|---|
| 2006/0282372 A1 | 12/2006 | Endres et al. | |
| 2007/0083460 A1 | 4/2007 | Bachenheimer | |
| 2007/0205275 A1* | 9/2007 | Nicola et al. | 235/383 |
| 2008/0189214 A1* | 8/2008 | Mueller et al. | 705/65 |

OTHER PUBLICATIONS

Compliance Benefits of Tokenization, Joel Dubin, Jul. 17, 2007, [online] [retrieved on Jan. 31, 2008], 3 pages, Retrieved from the Internet: http://searchsecurity.techtarget.com/tip/0,289483,sid14_gci1264563,00.html.

Reduce the Barrier to PCI Compliance: Encryption and Key Management Made Simple, Gary Epple, 5 pages, [online] [retrieved on Jan. 31, 2008] Retrieved from the Internet: http://www.paymetric.com/content/documents/transaction_directory_security_article_final.pdf.

PCI Data Security Standard compliance: Three steps to success, Joel Dubin, Jul. 9, 2007, [online] [retrieved on Jan. 31, 2008], 4 pages, Retrieved from the Internet: http://searchcio-midmarket.techtarget.com/tip/0,289483,sid183_gci1263580,00.html.

Using tokenization to secure credit card data and meet PCI Compliance requirements, Bryan Johnson, Oct. 12, 2007, [online] [retrieved on Jan. 31, 2008], 1 page, Retrieved from the Internet: http://www.braintreepaymentsolutions.com/blog/using-tokenization-to-secure-credit-card-data-and-meet-pci-compliance-requirements/.

PCI Compliance & SecureVault, [online] [retrieved on Jan. 31, 2008], 3 pages, Retrieved from the Internet: http://www.braintreepaymentsolutions.com/pci-compliance/p/3/.

A product "TCS Citadel," by Trust Commerce. No representation is made that this product is "prior art" within the meaning of that term under 35 U.S.C. §§ 102 or 103, but the product is being disclosed so as to fully comply with the duty of disclosure set forth in 37 C.F.R. § 1.56.

A product "Payment Data Management," by CyberSource. No representation is made that this product is "prior art" within the meaning of that term under 35 U.S.C. §§ 102 or 103, but the product is being disclosed so as to fully comply with the duty of disclosure set forth in 37 C.F.R. § 1.56.

A product "Transaction Vault," by MerchantLink. No representation is made that this product is "prior art" within the meaning of that term under 35 U.S.C. §§ 102 or 103, but the product is being disclosed so as to fully comply with the duty of disclosure set forth in 37 C.F.R. § 1.56.

A product "BuyerWall," by Electronic Payment Solutions (EPX). No representation is made that this product is "prior art" within the meaning of that term under 35 U.S.C. §§ 102 or 103, but the product is being disclosed so as to fully comply with the duty of disclosure set forth in 37 C.F.R. § 1.56.

A product "CIM—Customer Information Manager," by Authorize.NET. No representation is made that this product is "prior art" within the meaning of that term under 35 U.S.C. §§ 102 or 103, but the product is being disclosed so as to fully comply with the duty of disclosure set forth in 37 C.F.R. § 1.56.

First Data Unveils the Low Cost Complete Point-of-Sale Solution Integrating Products From First Data, LinkPoint, TeleCheck, and Valuelink. [online] [retrieved on Jul. 28, 2008], 1 page, Retrieved from the Internet: http://ir.firstdata.com/news/releasedetail.cfm?ReleaseID=90159.

Data Security, Hannaford School of Hard Knocks: While there is no cure-all to data theft, the case offers insight to strengthening the industry as a whole; Tom Wright, 2 pages, Jul. 2008 Transaction Trends.

MagTek Introduces the iPad(R), the most Secure PINpad providing end to end Protection, [online] [retrieved on Jul. 31, 2008], 3 pages, Retrieved from the Internet: http://www.reuters.com/article/pressRelease/idUS109900+14-Apr-2008+BW20080414.

VeriFone; VeriShield Protect; The most innovative, comprehensive and definitive security solution, [online] [retrieved on Jul. 31, 2008], 1 page http://www.verifone.com/industry-solutions/retail/payment-trends--security/verishield-protect.aspx.

U.S. Appl. No. 12/054,304, filed Apr. 2, 2009, Office Action.

International Preliminary Report on Patentability and Written Opinion for PCT/US2008/084229, mailed Jun. 3, 2010.

* cited by examiner

SECURE PAYMENT CAPTURE PROCESSES

CROSS-REFERENCE TO RELATED APPLICATIONS

Not applicable.

BACKGROUND OF THE INVENTION

1. The Field of the Invention

The present invention relates to secure payment capture for secure financial transactions. In particular, the present invention relates to processes that allow a merchant to accept payment device information for a financial transaction and then submit payment processing requests at a subsequent time or to perform real-time financial transactions without requiring sensitive information to be displayed to a merchant.

2. The Relevant Technology

Financial transactions occur in a wide range of locations. There is a large number of financial transaction events, however, that occur without the benefit or convenience of having point of sales equipment. For example, many sales representatives make sales presentations to potential customers at their homes to make the sales presentation more convenient for the customer as well as provide a more personable atmosphere in which the customer is more comfortable. In these situations, the customer's home likely does not have a point of sale device, such as a cash register. Furthermore, the sales representative likely travels frequently and needs to be able to be unburdened with heavy and/or sophisticated equipment that would require the customer to have network capabilities. In some situations, network capabilities are not possible at the immediate time of the sales presentation and/or sales negotiation. However, the sales representative would like to be able to "close the deal" while the customer is in a frame of mind to make such a decision. If a sales representative waits until after the sales pitch, the customer may have other distractions which cause the customer to change her mind about a purchase. Furthermore, as a matter of efficiency, it is much easier for the sales representative to obtain the financial transaction information rather than make potentially multiple phone calls or emails to the customer to try to obtain the financial information after the fact.

Other examples of financial transactions that occur without a point of sale device in immediate proximity other than the direct sale example provided above. These can include charitable donations, service vending, or any other situation where payment is desired to be proffered upon concluding a certain interaction between the merchant and the customer. As used herein, the term "merchant" is used broadly to refer to anyone receiving payment, while the term "customer" is used broadly to refer to anyone proffering payment.

The most common way for merchants to obtain payment information is for the merchant to request that the customer write down payment information. However, with fraud becoming an increasing concern, merchants want to be able to secure a customer's trust. Providing payment information on a piece of paper has the potential of becoming lost or stolen. In addition, the customer cannot be assured that the merchant will shred the paper. And, even if the merchant does shred the payment information, the information may be obtained by fraudulent means and reconstructed to discover the customer's sensitive information.

Therefore, it would be advantageous to provide merchants with the ability to be able to obtain payment information in a secure manner and to be able to pass this sensitive information securely to a payment authorization service without requiring the sensitive information to be displayed to the merchant, thus keeping the purchase event as secure as possible for the customer.

BRIEF DESCRIPTION OF THE DRAWINGS

To further clarify the features of the present invention, a more particular description of the invention will be displayed by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to methods for allowing a merchant to accept payment for any financial transaction, such as, but not limited to selling goods and/or services, accepting charitable donations, etc., even when the financial transaction is not performed within proximity of a point of sale device and then process the payment information in a manner that does not require the merchant to have access to sophisticated point of sale equipment or does not require sensitive information about the financial transaction to be displayed to the merchant. In many industries, the actual point at where a purchase is negotiated and made is not in an environment that easily lends itself to having immediate access to sophisticated purchasing equipment. As used herein, the term "merchant" refers to any person that has a financial account with which to receive payment. The merchant financial account does not have to be a "merchant account" as that term is sometimes known to refer to a specific type of account established and provided by a credit card acquirer. Rather, a merchant account is broader and can refer to any financial account set up to receive payment on behalf of the merchant.

One aspect of the invention is providing a simple, portable, secure device that the merchant can carry around with her to various sales presentations. The methods and processes of the present invention are not dependent on any particular type of point of sale device and can generally be used with any portable point of sale device that is configured to allow a user to perform the payment capture processes of the present invention. Various portable point of sales devices that are currently being manufactured can be adapted to enable at least some aspects of the methods and processes of the present invention. However, to fully describe the environment in which the methods and processes of the present invention can operate, one example of a secure device is shown in FIG. 1.

Figure 1:
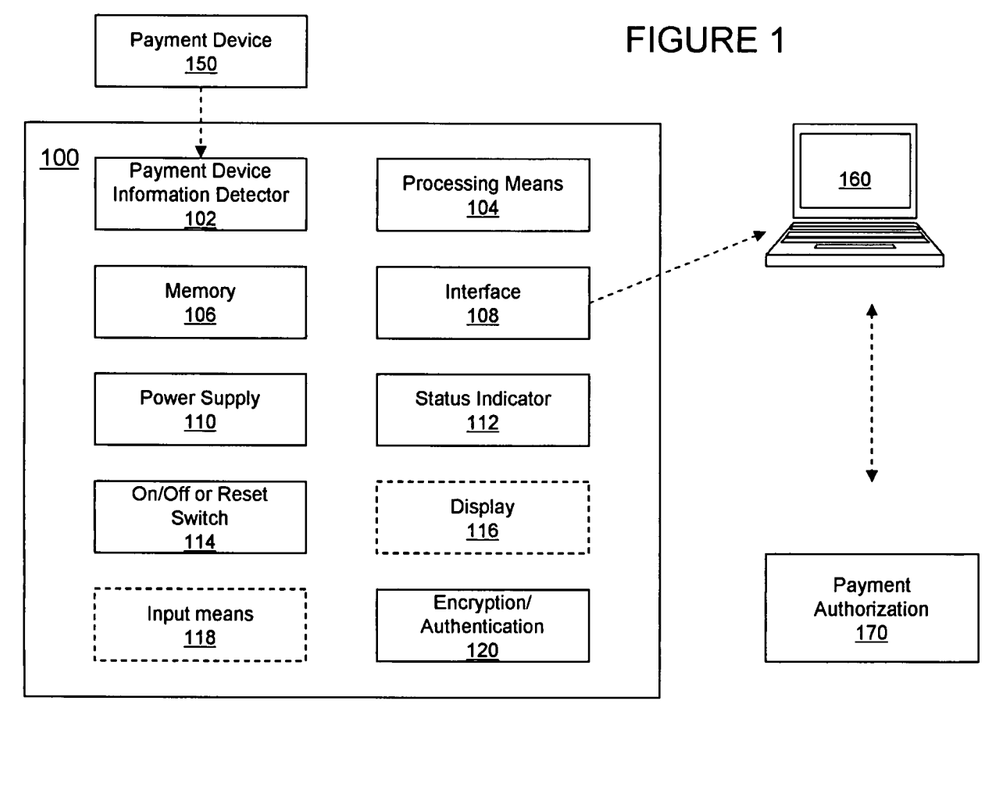
FIG. 1 illustrates a block diagram of an exemplary network environment.

FIG. 1 depicts a block diagram of a secure device 100 (hereinafter referred to as device 100) having a payment device information detector 102, a processing means 104, a memory 106, an interface 108, and a power supply 110. The payment device information detector 102 is any means for identifying and obtaining payment device information from any payment device 150. A payment device can be any device proffered for payment, such as, but not limited to, bank issued credit cards, debit cards, prepaid debit cards, gift cards, private label cards, closed loop payment cards, smart cards, a check, and the like. The payment device information detector 102 can thus include a magnetic reader, a magnetic check reader, an RFID tag reader, a transponder device, a smart card reader (i.e., pins that can contact metal contacts on an integrated circuit of a card), and/or a magnetic field detector, and the like.

In its very simplest form, the device 100 need only be able to detect a payment device presentation event, obtain payment device information (using payment device information detector 102), store the payment device information (using memory 106), connect to a payment processing application (using interface 108) such that the payment processing application can obtain the stored payment device information (push or pull), and delete the stored payment device information from the device 100 (using processing means 104). So as to comply with various financial regulations or policies, it may be necessary to place a limit such as, but not limited to, a maximum number of transactions within a given time period (e.g., a maximum of 20 credit card swipes), a total amount charged within a given time period (e.g., a maximum of $1000 of charges), or a maximum length of time that payment device information can be stored in memory (e.g., a maximum of 2 weeks). The device can regularly delete old payment device information based on any of these regulations or policies. However, the present invention is not limited to any particular regulation or policy and may not limit the amount of payment device information that can be stored.

At the appropriate time, the interface 108 establishes a connection with the client software, which is usually located on a client device owned by the merchant such as, but not limited to, a desktop computer, laptop computer, personal data assistant, cell phone, and the like. The interface 108 thus broadly covers any means for establishing a connection with the client software via hardwire or wireless mechanisms such as, but not limited to, a USB connection, a wireless Bluetooth connection, a RFID connection, a cellular connection, a satellite connection, and the like. The exact type of connection is not important.

The power supply 110 may be any means for supplying energy to the device 100 including an electrical port that the merchant can use to plug the device 100 into an electrical outlet. Or, the power supply 110 may be a battery, which can be recharged in various ways such as, but not limited to, a USB power connector, solar power, etc. Or, a combination of both an electrical outlet and a battery may be used.

The device 100 may have other optional features that can enhance the financial transaction methods and process of the present invention. As shown in FIG. 1, the device 100 can include a status indicator 112 which can include an light(s) or other indicator(s) that can display whether the device 100 is activated, whether a payment device presentation event was successful (e.g., whether a card swipe was captured or not), whether the device 100 is regenerating its power supply, or the like. Device 100 can also optionally include an on/off or reset switch 114 that can be used by the merchant to initiate the device. A display 116 may optionally be provided instead of or in addition to the status indicator 112 to provide information to the merchant.

Another optional feature includes input means 118 that provides the merchant a means for inputting data directly into the device 100. Thus, input means 116 can include a keypad, keyboard, softkey interface, touch console, microphone for receiving audio input, pointer device, and the like. In some embodiments, the display 116 and input means 118 may cooperate to not only display information but also receive input, such as an LCD screen or other pressure-sensitive display means.

To reduce manufacturing costs and enhance portability, it may be desirable to have the secure device to have very minimal features. However, additional optional features are described with the understanding that these merely can enhance the financial transaction experience depending on the needs of a particular merchant. Thus, while these optional features are described as part of the secure device 100, method and processes In one preferred embodiment, the device 100 has encryption/authentication 120 that encrypts data relating to the payment device presentation event and/or payment transaction event, preferably immediately after reading the payment device information from the payment device. For example, the encryption/authentication 120 can confirm that the customer is the owner of the payment device that is presented for payment, can require a merchant login before allowing the merchant to accept payment device presentation, as well as can encrypt portions of the payment device information for storage and/or for the read process, and the like. In embodiments where the payment device information is encrypted by encryption/authentication 120, the encryption algorithms are preferably decipherable by the payment authorization service (FIG. 1, 170).

As mentioned above, any variation of these features may be included in the device 100. The processing means 104 manages operation of the device 100 in each of these various embodiments. Importantly, the device 100 has been intentionally described broadly to cover various configurations of devices that could be used in the methods and processes of the present invention. Whatever configuration of the secure device 100, the main purpose of device 100 is to enable a merchant to be able to transport the device wherever sales are being made and to be able to securely capture payment information.

In one embodiment, at a time subsequent to storing payment device information, the merchant is able to place the device 100 in communication with a software application (e.g., operating on a laptop 160) that is configured to read the payment device information from the device 100, while not requiring the merchant to view the secure payment device information. That is, the transfer of payment device information from the secure device to the payment authorization system, in one embodiment, can occur in a manner that the merchant does not view the payment device information being transferred. In another embodiment, the merchant can place the device 100 in communication with a software application and capture payment device information in real time while not requiring the merchant to view the secure payment device information such that real-time capture and transfer of payment device information can occur transparently to the user. However, other embodiments can allow the user to view the payment device information, which requires, in some cases, that the payment device information be decrypted. Thus, the present invention allows the merchant to have the ability to not view payment device information during storage, processing and/or transferring of payment device information. In cases where the merchant does not view payment device information, it will be appreciated that the payment device information is completely unexposed from capture to payment processing. Preferably, the secure device is configured so that if it is maliciously accessed without using the proper protocols (such as tampered with or accessed with hacker software), the payment device information will be automatically destroyed. However, the present invention also allows a merchant to view payment device information that is captured on the secure device, if desired. In these embodiments, preferably sensitive information is displayed to the user by obscuring portions of the payment device information such as account numbers, security codes, etc., so that the merchant cannot view sensitive aspects of the payment device information.

Figure 2:
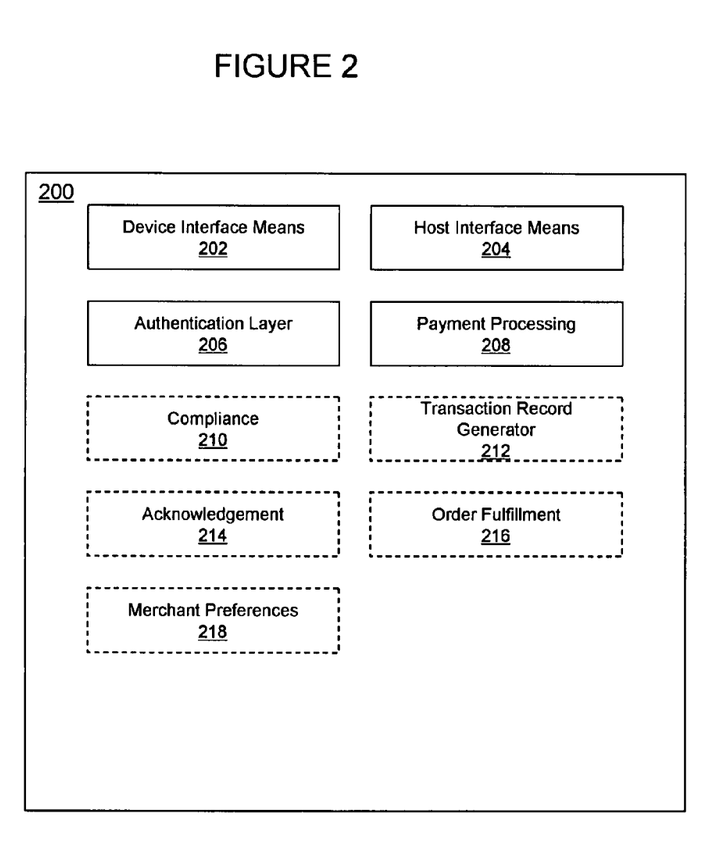
FIG. 2 illustrates a block diagram of an exemplary client application software.

The client software obtains the stored payment device information from the secure device 100 and uses it to generate a payment authorization request. FIG. 2 illustrates a block diagram of exemplary software modules that may be part of the client software 200. The client software 200 is preferably a small application that interfaces between the secure device and a payment authorization system (FIG. 1, 170) located on a remote server. The client software 200 includes a device interface means 202, a host interface means 204, and an authentication layer 206. When the merchant places the secure device within proximity of the client device having the client software 200, device interface means 202 establishes a connection between the secure device and the client computer. Further, the host interface means 204 establishes a connection between the merchant client computer and the payment authorization service. This connection can be any suitable connection means such as, but not limited to, an Internet connection, a WAN connection, a hard-wire connection, and the like.

In one embodiment, the device interface means 202 includes a listener that detects the secure device, such as detecting a USB device, detecting a Bluetooth signal, or the like. The exact manner of establishing a connection between the secure device and the client software is not important. In one embodiment, the client software 200 automatically establishes a connection when the secure device is within range of the client device, and/or upon plugging the secure device into the client device. This can be done if the listener is ready to execute and display the software upon identifying a secure device.

The authentication layer 206 requires the merchant to authenticate herself as being authorized to transmit payment information to the payment authorization system. This typically requires a login and password. Other authentication/security measures may be used such as image recognition, captcha processes, checking licensing or registration information using information stored on the device 100, and/or biometrics. The authentication layer can further authenticate the secure device to the merchant client computer.

Once connections have been established and all parties authenticated, the payment processing module 206 initiates reading stored payment device information from the secure device. This can be accomplished by either push or pull methods. In a push method, the payment processing module may send a signal to the secure device, wherein the secure device begins reading and sending payment device information to the client application to be stored. In a pull method, the payment processing module may read payment device information stored in the memory of the secure device.

The payment processing module 208 determines, depending on the type of payment device, what billing information is needed, and transmits the billing information to the payment authorization service to obtain authorization for the payment. When the payment processing module 208 receives a payment authorization status approving, denying, or notifying of a process failure of payment authorization, the payment processing module 208 can display the payment status to the merchant. Note that in one embodiment, during the process of obtaining the payment device information from the secure device and submitting a payment authorization request, the payment device information is never displayed to the merchant, thus maintaining security of the payment process.

Once the payment status is approved, a compliance module 210 may optionally control deletion of payment device information on the secure device to ensure that payment device information is not stored longer than is necessary. The compliance module may initiate deletion of payment device information as well as verify that deletion was successful. Alternatively, deletion of the payment device information from the secure device can be initiated and/or controlled by the payment authorization service, using the connections formed from device interface means 202 and/or host interface means 204.

The client software 200 thus handles payment processing for the merchant by reading payment device information previously captured from by the secure device and passing the payment device information to the authorization service. In some embodiments, it will be desirable to make the client software as simplified as possible so that its functionalities are minimized to reduce the exposure of the software to malicious third parties. With added functionality comes added security/authentication requirements, so it may be preferable to protect more minimal functionalities and limit the client software to just reading the payment device information and fulfilling the payment authorization request, while leaving other functionalities relating to fulfilling a financial transaction to other services.

However, in some embodiments, it may be desirable to provide the merchant with additional transaction functionalities, although, it should be understood that these added functionalities are optional. As shown in FIG. 2, one optional feature is a transaction record generator 212 that uses the captures payment device information to generate a transaction record. The transaction record can includes order information, billing information, and payment authorization information. Order information includes information relating to a specific purchase made by the customer. The billing information includes information that is sent to a payment authorization service to obtain payment authorization information. Payment authorization status is information on whether the payment was approved, declined, or whether there was a process failure.

In one optional embodiment, an acknowledgement module 214 allows the merchant to send a transaction record acknowledgement to the customer to inform the customer whether the transaction has been completed or whether there was a problem processing the customer's payment. However, generally, the payment status to the merchant and the customer will be done by the payment authorization service.

Further, the client software may optionally include order fulfillment 216 logic that automatically performs steps to fulfill the financial transaction once the payment is authorized by payment authorization service. For example, this can include initiating shipment of goods to the merchant or customer. Or, this can include notifying service providers that a service has been purchased and to schedule and/or fulfill the requested service. It will also be appreciated that depending on the complexity of the financial transaction, the secure device may also include an order application that displays potential services or items for sale and allows the customer to fill in basic ordering information such as the number of units of a widget.

In another optional embodiment, the merchant may be able to specify merchant preferences 218 such as whether the client software is initiated automatically upon detecting a secure device, the level of authentication required to access the client software, and the like. Although generally, any merchant preferences will be made through the payment authorization service.

One advantage of the methods and processes of the invention is to separate the sales event from processing the transaction. This allows a sales representative to move the sales process along without getting bogged down with details relating to processing the sales transaction, such as having the right point of sales equipment, having a network connection, whether the payment authorization system will be available, etc., saving the customer time as well. In addition, having the transaction processing software separate from the secure device allows the footprint on the secure device to be as small as possible, further contributing to the portability of the secure device.

While the client software is described as separate from the payment authorization system, it will be appreciated that aspects of the client software can be located at the payment authorization system. For example, in one embodiment, the compliance module 210, transaction record generator 212, acknowledgement 214, order fulfillment 216, and/or merchant preferences 218 components can be located remotely from the merchant client at the payment authorization service, which handles generating and processing the transaction record. In this embodiment, once the payment device information is read, the client software may encrypt, temporarily cache, and transmit the payment device information to the payment authorization service to perform the rest of the transaction process, including optionally generating and authorizing the transaction record, so that the merchant client device does not keep a record of the transaction record. This is one embodiment where the client software would have minimal functionality and primarily responsible for performing the payment authorization.

Figure 3:
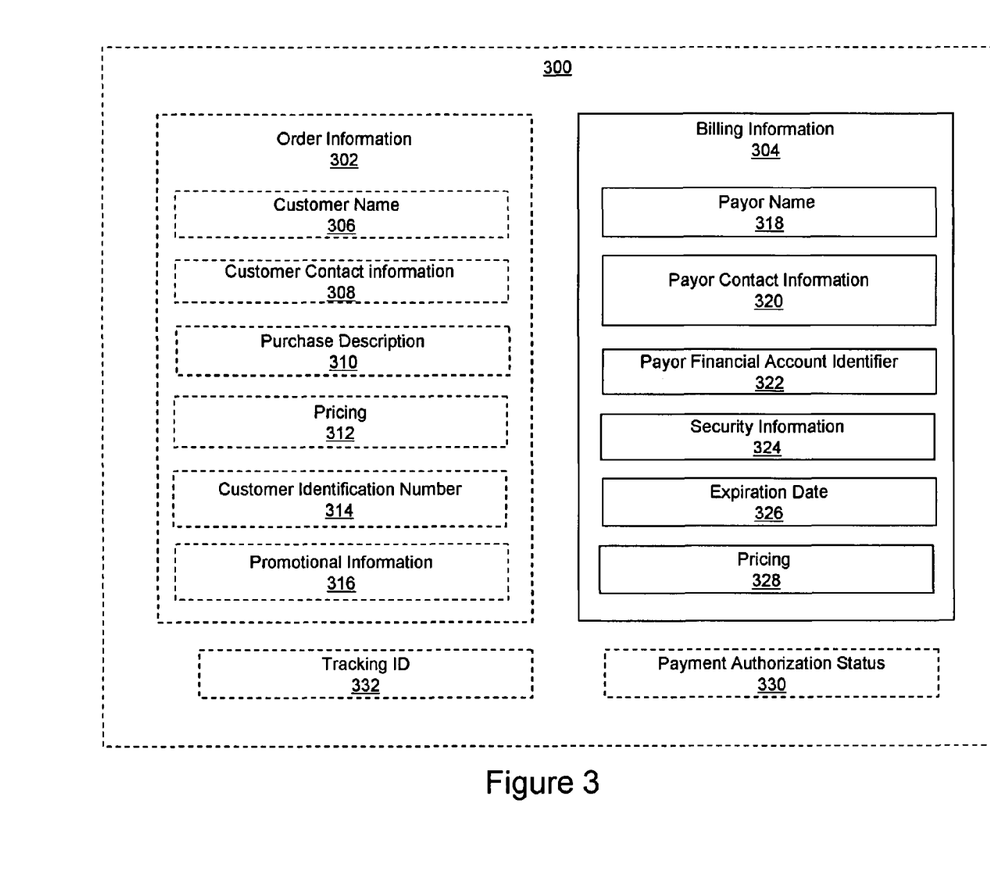
FIG. 3 illustrates a block diagram of an exemplary transaction record.

FIG. 3 depicts an example of a transaction record 300 that can optionally be generated in relation to a point of sale transaction. However, it will be appreciated that the present invention is not limited to this type of transaction and that the payment capture methods and processes can be used for various types of financial transactions. The point of sale example in FIG. 3 is provided by way of illustration and not by way of limitation. Further, data fields in the transaction record can vary depending on the type of payment device that is presented for payment.

However, exemplarily, transaction record 300 includes order information 302, billing information 304, payment authorization status 330, and, a tracking ID 332. Order information 302 includes information pertaining to the particular order for goods or services that is being purchased. As such, the order information 302 may include customer name 306, customer contact information 308 (such as address, telephone, email, etc.), purchase description 310 (such as items/services purchased, quantities, purchase amounts, etc.), pricing 312 (such as purchase price, tax, total purchase amount, shipping, handling, etc.), and a customer identification number 314 (such as any unique identifier associated with the customer such as a randomly assigned customer code, last 4 digits of social security number, last 4 digits of credit card number, etc.). The order information 302 may also include any promotional information 316 (such as discounts). Generally, the order information 302 can contain any information needed to determine the goods or services purchased by the customer and to ensure that same are delivered to the customer. The order information is shown in dashed lines to illustrate that obtaining such information is not necessarily the focus of the present invention.

Billing information 304 can include any information relating to paying for the goods or services. This can include payor name 318, payor contact information 320 (such as address, telephone, email, etc.), payor financial account identifier 322 (such as an account number, routing transit number), security information 324 associated with the payment device (such as a PIN verification information), expiration date 326 of the payor financial account, and payment amount 328 (such as purchase price, tax, total purchase amount, etc.).

The type of billing information will vary depending on the payment device offered for payment. The magnetic strip on the back of many financial cards can contain information about the account number, the name of the card owner, expiration date, a service code, and other discretionary data such as a pin verification key indicator, pin verification value, or card verification value/code. For checks, the magnetic strip at the bottom of the check can include a routing transit number, an account number, and/or a particular check number. EMV cards may proffer additional cryptographic authentication information to provide authentication of the card to the payment authorization service. For example, the customer may be required to enter their PIN into the secure device, which is encrypted so that the merchant cannot access the PIN information, which is included in the billing information as security information 324 for payment processing in an encrypted format. Other security information 324 includes biometric information, for example, where the owner of the payment device is required to perform a thumbprint scan, which information is encrypted for payment authorization.

Some of the data for order information and billing information may overlap. For example, where the customer is the same as the payment device owner, the customer name and payor's name and contact information may be the same. In any event, the secure device stores at least the payment device information, which can be used to generate billing information and/or a payment authorization request. In one embodiment, all of the billing information except the pricing 328 can be obtained from the payment device without the merchant being required to enter any of the information, saving time for the merchant.

A payment authorization request (not shown) that is sent to a payment authorization service can be generated using some or all of the billing information. In some embodiments, the payment authorization request can simply contain the payor financial account identifier 322, security information 342, expiration date 326 and pricing 328. In another embodiment, only the payor financial account identifier 322 and pricing 328 is needed such as with a check request identifying a routing transit number and payor checking account number.

Payment authorization status 330 can include information on whether the billing information was submitted to a payment authorization service and the status of the payment authorization request (i.e., approved, declined, or process failure). Tracking ID 332 includes a unique identifier associated with the transaction which can be sequentially or randomly generated. The tracking ID can be automatically generated, or can be selected by the merchant.

As mentioned above, the transaction record 300 is generated based on multiple events that happen during the sales transaction process. Ultimately, the transaction record 300 can be stored at the payment authorization service as a record of the sale and can be referred to by the merchant and/or customer to obtain information about the sale. Of course, sensitive information such as account number, security information, etc., may be hidden from the merchant and/or customer in accordance with privacy laws and financial transaction regulations.

Figure 4:
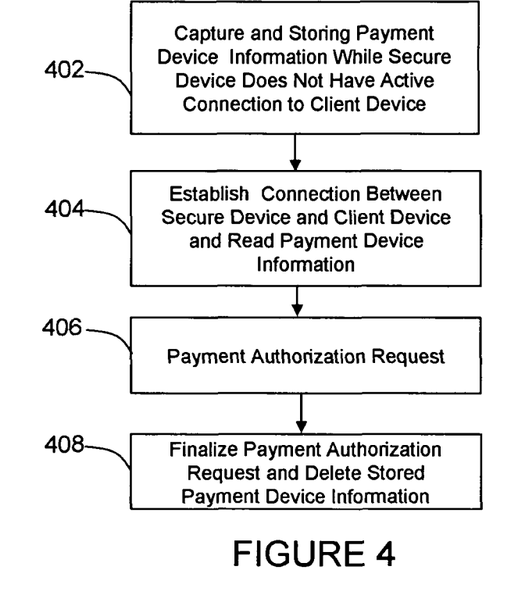
FIG. 4 illustrates a flow diagram of an overview of the secure payment capture process.

FIG. 4 depicts an overview of the payment capture process using a portable secure device. At 402, the merchant captures payment information and stores payment information using the secure device while the said device does not have an active connection to a client device. At 404, the merchant establishes a connection between the secure device and client device and reads payment device information from the secure device. At 406, the merchant submits the payment authorization request for authorization. At 408, the client software receives a payment status depending on whether the payment was approved, declined, or a process failure. Each of these stages will now be described in further detail.

Figure 5:
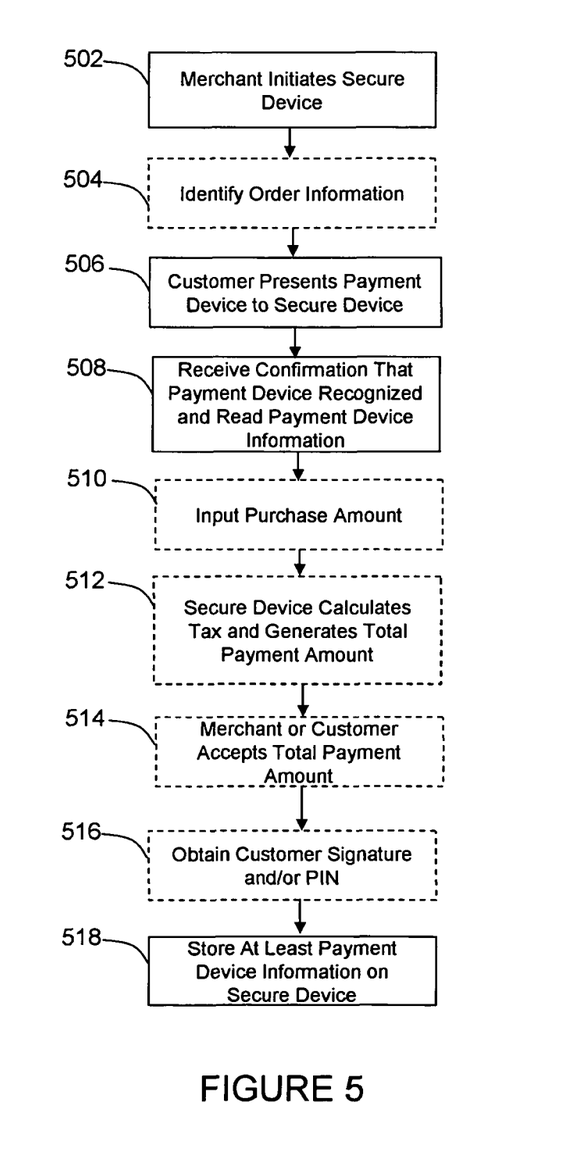
FIG. 5 illustrates a flow diagram of an exemplary process for capturing payment device information with a secure device.

FIG. 5 depicts various embodiments for capturing payment information and storing payment information while the secure device does not have an active connection to the merchant's client device. Since the present invention can be used with various types of financial transactions, capturing the payment information can occur in various ways. For example, in a point of sale transaction, payment capture typically occurs at the sales negotiation to close a deal. Beforehand, the merchant may have displayed signage to potential customers that payment devices such as credit cards, checks, etc. are welcome. However, the methods of the present invention can apply to any financial transaction.

When the customer agrees to make a payment, the merchant, at 502, initiates a secure device. This can include the merchant checking to ensure that the battery is fully charged and that the secure device is ready to accept payment device presentation events. The merchant, at 504, optionally can identify order information. In one embodiment, the customer may be asked to fill out a paper-based order form. The paper-based order form may contain much of the same information as the transaction record, at least as much information as the customer is able to fill out, such as customer name, customer contact information, purchase description, pricing, or promotional information. If known, the customer may also write down her customer identification number. The paper-based order form may be a duplicate order form so that the customer may walk away from the event with a copy of the order.

At 506, the customer or merchant presents a payment device to the secure device. As described above, there are a plethora of different types of payment devices that a customer can offer to purchase. As such, the secure device may be configured to be able to accept payment devices that are most common in a merchant's line of business. In any case, at 508, the merchant receives confirmation that the payment device is successfully recognized by the secure device.

As also described above, the secure device may be used to obtain information about the financial transaction above and beyond simply the payment device information. As shown in FIG. 5, some optional steps may occur, depending on the sophistication of the secure device. At 510, the merchant may input a purchase amount. At 512, the secure device optionally may calculate tax and a total payment amount. At 514, the merchant can optionally accept the total payment amount displayed on the secure device.

At 516, the merchant can optionally obtain other information about customer such as the customer's signature and/or PIN. The customer signature and/or PIN could be entered electronically into the secure device. Alternatively, the merchant may ask the customer to sign the paper-based order form. At 518, the secure device stores at least payment device information on the secure device. As mentioned above, financial regulations or policies may limit the number of transactions, the amount of payment device information that can be stored, or the amount of time that payment device information stays stored on the secure device.

The merchant may follow this up with providing the customer with a copy of the order form, writing the total payment amount, information about the payment device (such as the last four digits of a credit card number) to help the customer and merchant remember how the customer paid for the purchase. The merchant may also have a customer void a check for check-related payment devices.

After the payment capture has occurred, the merchant can later utilize the payment device information from the secure device to complete the financial transaction. However, it should be appreciated that the steps in FIG. 5 are not required to be done at a sales event. This is just one example of how the merchant can obtain payment device information. However, other ways of obtaining the payment device information are possible. In addition, the present invention is not dependent upon the length of time between storing the payment device information on the secure device and completing the rest of the financial transaction, although such length of time may be constrained by financial regulations or policies. For example, the secure device may have an additional component that monitors the time between the first payment device information receipt and the current time. If it has been too long between obtaining the first payment device information, the secure device can be programmed to automatically delete payment device information that has stayed on the device too long.

Figure 6A:
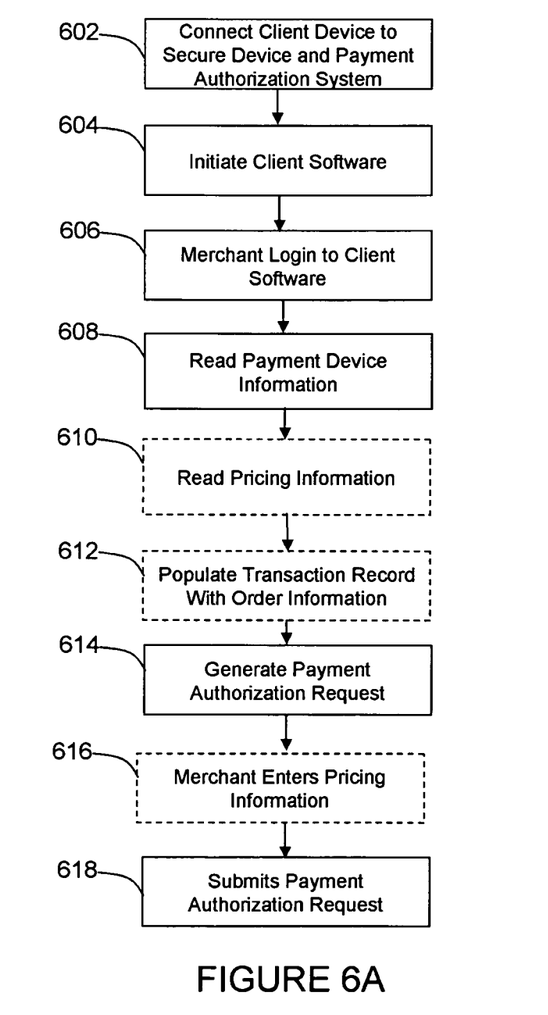
FIG. 6A illustrates a flow diagram of an exemplary process for reading payment device information from the secure device.

In any event, FIG. 6A depicts a method for reading the payment device information from the secure device once the merchant is ready to complete the financial transaction. At 602, the merchant connects her client device to the secure device and to the payment authorization system. The term "connect" is used very broadly in that it does not require a physical connection between these systems. In some cases, a wireless connection can be established. For wireless networks, this may be enough for the client device to detect the secure device on which payment device information has been previously stored. In other embodiments, the secure device may need to be connected by a wire, such as a USB cable, in order for the client device to detect the secure device. At 604, the client software is initiated. In some embodiments, detecting the secure device can automatically initiate the client software. In other embodiments, the merchant may have to manually select the client software.

At 606, authentication information is received from the merchant, such as the merchant performing a login operation into the client software. The merchant may also be required to identify a port from which to read the information, such as a USB port ID. At 608, the client software reads the previously stored payment device information from the secure device. As discussed above, this can be either a push or pull event. Depending on the type of information that the secure device is configured to store, at 610, the client software may also optionally read pricing information from the secure device.

At 612, if pricing information is read, the client software optionally populates a transaction record with order information. At 614, the client software generates a payment authorization request maintaining the payment device information in its encrypted form. Optionally, the client software can also populate the transaction record with billing information using the information from the payment device information. If any information is lacking in either the order information or billing information, the client software may allow the merchant to input additional information. For example, at 616, the client software may optionally allow the merchant to enter pricing information.

At 618, the merchant submits the payment authorization request, which sends the payment authorization request containing encrypted information to a payment authorization service.

The process can be configured so that the user client reads all of the payment device information in a single batch and then proceeds to submit the payment authorization requests such that the secure device is no longer required to be connected. Or, the process can be configured to read the payment device information one entry at a time while the merchant submits each payment authorization request separately.

Figure 6B:
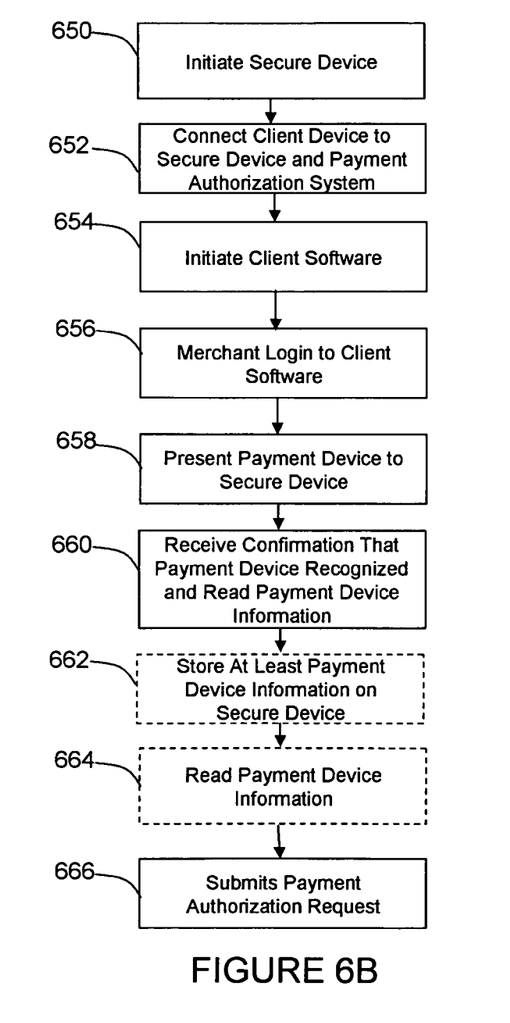
FIG. 6B illustrates a flow diagram of an exemplary process for real-time capturing of payment device information using a secure device.

In one embodiment, the payment capture can occur while the secure device has an active connection with the client device, as shown in FIG. 6B. This embodiment shows that a payment capture can occur in real-time. At 650, the merchant initiates the secure device. At 652, the merchant connects the merchant's client device with the secure device and the payment authorization system. At 654, the merchant initiates the client software on the client device. Of course, 650, 652 and 654 can be performed in different order.

At 656, the merchant authenticates herself to the client software. At 658, the merchant presents a payment device to the secure device, in any of the manners described above. At 660, the secure device can confirm whether the payment device was recognized. Depending on the configuration, at 662, the secure device can store the payment device information. This is shown in a dashed line to illustrate that other embodiments contemplate that the secure device may not store the payment device information and passes the information directly to the client software. At 664, if the payment device information is stored on the secure device, the client software can read the payment device information that may be stored on the secure device.

At 666, the client software takes the payment device information, whether read from the secure device or passed through to the client software, and generates a payment authorization request, which the merchant submits to the payment authorization service. This embodiment thus illustrates that the secure device can be used for real-time payment capture.

Both examples of capturing payment device information and submitting payment authorization requests (FIGS. 5 and 6A; FIG. 6B), can be performed in a manner that it is not required to display sensitive payment device information to the merchant. Thus, the merchant can opt to have the entire payment capture and payment authorization process be performed without the merchant being aware of any of the payment device information.

However, if desired, the merchant could choose to view aspects of the payment device information, preferably with sensitive information such as most of the account number and/or security codes obscured so that the merchant cannot copy that information down. In embodiments where a merchant chooses to be able to access some or all of the payment device information, a storage device on the merchant client can at least temporarily store the payment device information; or, the merchant may be able to remotely access the payment device information after it is stored by the remote payment authorization service. The drawings do not show a storage device associated with the client software in FIG. 2 in order to emphasize that it is not required to store and/or display the payment device information at the client device.

Figure 7:
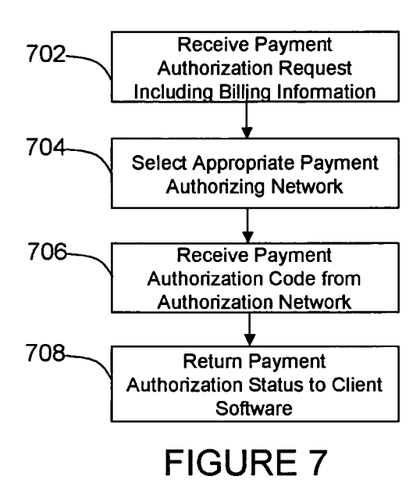
FIG. 7 illustrates a flow diagram of an exemplary process for authorizing a payment.

Turning to FIG. 7, the payment authorization system should be broadly construed to be any payment system—credit card, checking, closed loop, private label, and the like. So as not to obscure the present invention, a particular payment authorization system will not described in detail since the processes are not dependent on any one type of payment authorization system. In one embodiment, the payment authorization system is able to receive payment authorization requests for many different types of payment devices and can route the payment authorization request to one of various payment authorization networks (such as a credit card authorization system, debit card authorization system, checking account settlement system, closed loop authorization system, etc.). Or, the payment authorization system may be the same as a payment authorization network and the secure device configured to accept payments for only a certain type of payment device. It should be noted that the payment authorization system may take into account when a merchant uses financial transactions using a secure device and categorize the transaction as a "card-present" transaction. The payment authorization system may provide an incentive of lower fees to merchants who accept "card-present" transactions.

At 702, the payment authorization system receives a payment authorizing request, including billing information. At 704, the payment authorization system submits the billing information to a payment authorizing network. At 706, the payment authorization system receives confirmation that the payment was approved or declined or process failure and receives a payment authorization code from the authorization network. At 708, the payment authorization system returns the payment authorization results to the client software of the merchant.

Figure 8:
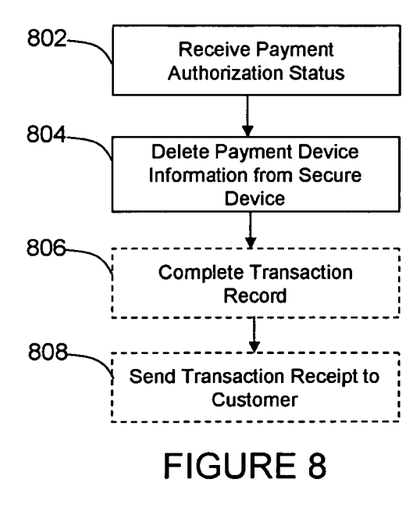
FIG. 8 illustrates a flow diagram of an exemplary process for finalizing payment process.

Once the merchant receives confirmation that the payment went thru, the merchant may complete the rest of the financial transaction. Thus, as shown in FIG. 8, at 802, the client software receives status from the payment authorization service that the payment authorization request is approved, denied, or whether there was a process failure. At 804, the client software deletes the payment device information from the secure device. At 806, the merchant can use the client software to optionally complete a transaction record described above. At 808, the merchant preference may specify to send a transaction receipt to the customer to inform the customer of the payment status. This can be done via email, telephone, mail, IM, text messaging, and the like. In one embodiment, where the payment device information is read one at a time, the deletion can occur one at a time. In embodiments where the payment device information is read as a batch, the client software can determine whether the secure device is still connected to the client device, and, if not, request that the merchant reconnect the secure device. Or, as mentioned above, the merchant can rely on a time-based deletion performed by the secure device. Alternatively, deleting can include a first-in-first-out overwriting of older payment device information with newer payment device information.

It will be appreciated that once the payment authorization request is approved, other steps to fulfill the financial transaction can occur. In one embodiment these steps can be performed automatically without the merchant's involvement.

For example, once the payment authorization request is approved, the client software can further submit order information to an order fulfillment service located on a remote service that accomplishes the task of shipping the goods to the merchant and/or customer. The client software may also automatically update accounting information. For example, where the merchant is a distributor for a wholesaler, the client software can transmit information that updates records maintained by the wholesaler to track distributor activity. Other types of functions that can spring from payment authorization can be envisioned and implemented in the present invention.

Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a merchant to perform a financial transaction using a secure device, the method comprising:
    capturing payment device information with a secure device configured to securely store the payment device information;
    storing, by the secure device, the payment device information in an encrypted format while the secure device does not have an active connection to a client device;
    establishing a connection between the secure device and the client device;
    using a client application on the client device to retrieve the stored payment device information from the secure device such that the retrieved payment device information is not required to be displayed;
    submitting, by the client device, a payment authorization request to a payment authorization service, the payment authorization request including at least some of the retrieved payment device information;
    receiving, by the client device, status from the payment authorization service that the payment authorization request is approved or declined; and
    deleting the stored payment device information from the secure device.

2. The method as recited in claim 1, wherein capturing payment device information with a secure device configured to securely store the payment device information comprises the payment device being at least one of:
    a bank issued credit card; a debit card;
    a prepaid debit card;
    a gift card;
    a private label card;
    a closed loop payment card;
    a smart card; or
    a check.

3. The method as recited in claim 1, wherein capturing payment device information with a secure device configured to securely store the payment device information comprises the secure device having at least one of:
    a magnetic reader;
    a magnetic check reader;
    an RFID tag reader;
    a transponder device;
    a smart card reader; or
    a magnetic field detector.

4. The method as recited in claim 1, wherein using a client application on the client device to retrieve the stored payment device information from the secure device comprises using at least one of a push or pull method to retrieve the stored payment device information.

5. The method as recited in claim 1, further comprising limiting additional storage of payment device information on the secure device when at least one of the following occurs:
    the secure device reaches a maximum number of transactions within a given time period;

the secure device reaches a predetermined total amount charged within a given time period; or a maximum length of time passes that payment device information can be stored.

* * * * *